US006839901B1

(12) United States Patent
De Saint Marc et al.

(10) Patent No.: US 6,839,901 B1
(45) Date of Patent: Jan. 4, 2005

(54) MULTICHANNEL DIGITAL TELEVISION SYSTEM

(75) Inventors: Guillaume De Saint Marc, Paris (FR); Daniel Thomas, Montigny le Bretonneaux (FR)

(73) Assignee: Canal + Societe Anonyme, Paris (FR)

( * ) Notice: Subject to any disclaimer, the term of this patent is extended or adjusted under 35 U.S.C. 154(b) by 0 days.

(21) Appl. No.: 09/553,667

(22) Filed: Apr. 20, 2000

Related U.S. Application Data

(63) Continuation of application No. PCT/IB98/01581, filed on Oct. 1, 1998.

(30) Foreign Application Priority Data

Oct. 24, 1997 (EP) .............................. 97402532

(51) Int. Cl.⁷ ........................... H04N 7/025; H04N 7/10
(52) U.S. Cl. .............................. 725/32; 725/135; 725/38
(58) Field of Search ........................... 725/135, 32, 36, 725/38, 61, 112, 109, 110, 136

(56) References Cited

U.S. PATENT DOCUMENTS

| 4,602,279 A | * | 7/1986 | Freeman ....................... 725/35 |
| 4,862,268 A | | 8/1989 | Campbell et al. ............ 358/141 |
| 5,210,611 A | | 5/1993 | Yee et al. ................. 358/191.1 |
| 5,485,221 A | | 1/1996 | Banker et al. ............... 348/563 |
| 5,589,892 A | | 12/1996 | Knee et al. .................. 348/731 |
| 5,600,368 A | | 2/1997 | Matthews, III ............. 348/143 |
| 5,818,438 A | * | 10/1998 | Howe et al. ................. 345/718 |
| 5,880,789 A | * | 3/1999 | Inaba .......................... 725/137 |
| 5,937,329 A | * | 8/1999 | Helmy et al. .................. 725/68 |
| 6,157,814 A | * | 12/2000 | Hymel et al. ............... 340/7.56 |
| 6,252,632 B1 | * | 6/2001 | Cavallaro .................... 348/585 |
| 6,412,111 B1 | * | 6/2002 | Cato ........................... 725/137 |

FOREIGN PATENT DOCUMENTS

| EP | 0 680 216 A2 | 11/1995 |
| EP | 0 782 332 A2 | 7/1997 |
| WO | WO 96/27840 | 9/1996 |

OTHER PUBLICATIONS

Jörgen Rosengren, "Electronic Programme Guides and Service Information", Phillips Journal of Research, vol. 50, No. 1/2, 1996, pp. 253–265.

* cited by examiner

Primary Examiner—Vivek Srivastava
Assistant Examiner—Matthew Demicco
(74) Attorney, Agent, or Firm—Osha & May L.L.P.

(57) ABSTRACT

A digital television system including a transmission means for transmitting digital audiovisual information on a plurality of channels and means for introducing in real time an event message concerning a live event broadcast on at least one channel into the datastream of at least one other channel, where the event message includes information regarding the occurrence of an event and the channel on which the event has occurred.

16 Claims, 4 Drawing Sheets

US 6,839,901 B1

MULTICHANNEL DIGITAL TELEVISION SYSTEM

This is a continuation of International Application PCT/IB98/01581, with an international filing date of Oct. 1, 1998.

BACKGROUND OF INVENTION

1. Field of Invention

The present invention relates to a digital television system including a transmission means for transmitting audiovisual information in a digital datastream on a plurality of channels.

2. Description of Related Art

Digital television systems are becoming increasing established, notably in the field of pay TV systems. Encrypted or scrambled audiovisual information is sent, usually by a satellite or, satellite/cable link, to a number of subscribers, each possessing a decoder or receiver/decoder capable of descrambling the transmitted program for subsequent viewing. Terrestrial digital broadcast systems are also known. Recent systems have also used the broadcast link to transmit other data, in addition to or as well as audiovisual data, such as computer programs or interactive applications to the decoder or to a connected PC.

One of the advantages of digital television lies in the number of channels that are available in such systems and the flexibility that is available to the television service provider regarding what channel choices or menus may be made available to a subscriber of the service. Other than a standard set of subscription channels, the system may also include, for example, a pay-per-view function enabling a subscriber to pay for a particular film, sporting event etc.

With the increasing channel availability, one service that is proving increasingly popular is the simultaneous transmission of the same sporting event as viewed from a number of different camera angles. In a similar manner, for a tennis or football competition, a number of matches in the same cup may be broadcast simultaneously the same evening on different channels. In combination with a pay-per-view type service, the subscriber may choose to pay for one of the matches broadcast on one channel, all of the matches that evening, all the matches in the tournament over the next few weeks etc.

Whilst the viewer benefits from the increased choice available, the large numbers of channels that are available may prove distracting and, in practice, a viewer may often have difficulty managing the viewing possibilities available.

Some stations provide, for example, a menu or home channel where the viewer can look at what is currently playing on all the channels, each channel being displayed in a small section in a grill displayed on the television screen. Where a large number of channels are displayed, however, it can be difficult for a viewer to adequately discern what is happening on any one channel. For these reasons, this solution is not particularly suitable for simultaneous live broadcasts on more than a few channels.

SUMMARY OF INVENTION

It is an object of the present invention to overcome some of the drawbacks of a multichannel service and to facilitate the navigation of the channels by a viewer.

According to the present invention there is provided a digital television system including a transmission means for transmitting digital audiovisual information on a plurality of channels characterised in further comprising a means for introducing in real time an event message concerning a live event broadcast on at least one channel into the datastream of at least one other channel, the event message including information regarding the occurrence of an event and the channel on which the event has occurred.

For example, in the case of the live transmission of number of football matches, the event message can be used to indicate the occurrence of a goal on one of the channels, as well as providing an indication of the channel on which this has occurred. The event message can be generated manually at the transmission centre by an operator watching all the matches simultaneously. As will be described, this information can be treated by an application within the decoder in a number of ways to facilitate channel selection for a viewer and so as to enable the viewer to change to a channel where an event has occurred.

In one particularly advantageous realisation of the invention, the transmission means further includes a delay device for introducing a predetermined delay into the transmission time of the audiovisual information broadcast on each of the channels. For example, the digital audiovisual information can be temporarily store on a disk or in a RAM type memory device for 30 seconds or so before being transmitted.

Other delay means include analogue tape loops for delaying analogue audiovisual signals before digital conversion is carried out etc. The delay may also be introduced downstream at the decoder.

The advantage of this embodiment is that, for the viewer, the event indicating signal (which is broadcast without a delay) will arrive before the event in question. Thus, changing channels in response to this signal will mean that viewer will see both the build-up to the event and the event itself. Furthermore, the delay will be effectively invisible to the viewer, who will have the sensation of watching the match "live".

Alternatively, given the fact that a replay is often shown where an event such as a goal occurs, the system may be set up without a delay between the event signal and the audiovisual data. In this case, the viewer may change channels after the event, in time to catch the replay. However, although possible, this solution is considerably less satisfactory for the viewer than the solution described above.

In a practical realisation, the means for introducing an event message may comprise a computer, such as a simple PC or a combination client/server device, adapted to generate an event message in respond to a command by an operator, the event message being sent, for example, via a data injector to a multiplexer receiving audiovisual information for each channel as well as the event message.

In particular, where the audiovisual data is supplied to the multiplexer in an MPEG format, the computer may be adapted to send an event message in the form of a predetermined MPEG section to the multiplexer.

MPEG is a well-known standard developed for the field of digital broadcasting in which data is arranged into a series of tables, each table including a packet ID etc.

In the context of the present patent application, the term includes all variants, modifications or developments of the basic MPEG format such as MPEG-2 as defined in the standards ISO 13818-1 to ISO 13818-4.

In one embodiment, the digital television system further comprises a decoder adapted to display an icon on the screen upon reception of an event message to indicate the occurrence of an event. Upon display of this icon the viewer may change channels, for example, by means of a remote control associated with the decoder. Alternatively, the viewer may pre-program the decoder to automatically change channels to a channel where a goal has occurred, for example.

In the case where an icon is displayed, the decoder is preferably adapted to automatically change to the channel in question following a "yes/no" response by the viewer to the icon. In this case, the icon does not even need to display the channel information, but only the fact that an event has occurred. If the viewer indicates "yes" or "OK" the decoder changes channel. The "yes" response may correspond to a signal from a remote control indicating that any of the buttons or a predetermined button of the remote control has been depressed. If the viewer indicates "no", for example, by making no response, the decoder remains tuned to the present channel.

In one embodiment of the invention, the decoder is adapted to display a further icon after a change of channel by the viewer in response to the first displayed icon, eg to ask if the viewer wishes to return to the first channel that he was watching.

This predetermined time will naturally depend on the time delay (if any) introduced in the transmission stream of the audiovisual data. For example, where a delay of 30 seconds is introduced in the transmission, the flagged event will follow approximately 30 seconds after the event signal. If the application has received a change channel command, the application will ask the viewer if he wants to change channel 45 seconds or so later, i.e. after the event has been shown. The application may use either the change channel message or the arrival of the event message as the starting point for the delay.

As will be understood, conventional digital decoders are combination software and hardware devices and the increased functionality may be added by programming the decoder with a software application.

Depending on the complexity of the application, more or less memory space in the decoder will be required to carry out each of the functions described. Whilst this application may be permanently stored in the decoder, in one advantageous embodiment the application is downloaded in the decoder by the transmission means.

For example, at the start of a match, the application can be included in the transmitted digital data stream, the viewer being asked at that time if he wishes to download the application. If he agrees, the application will remain in the decoder and will function for at least the duration of the match. If not, the decoder will not download the application.

Preferably, the transmission means further includes encryption means for encrypting transmitted digital data, including the transmitted audiovisual data and the transmitted event message, the decoder comprising decryption means adapted to decrypt the broadcast digital data prior to viewing and processing of the event message.

Following a known encryption technique used in a digital television system, scrambled data may be transmitted together with a control word for descrambling of the data, the control word itself being encrypted by a so-called exploitation key and transmitted in encrypted form. The decoder possesses an equivalent of the exploitation key to decrypt the control word and descramble the data. Other security measures known generally from pay TV systems may equally be used in the present system to restrict access.

The present invention also extends to a decoder for use in a digital television system as described above, in particular a decoder equipped with an application adapted to generate an icon on the screen to indicate the reception of an event message.

The present invention equally extends to a method for digitally transmitting and receiving audiovisual information in a digital datastream on a plurality of channels.

Whilst the, description refers to <<receiver/decoders>> and <<decoders>> it will be understood that the present invention applies equally to embodiments having a receiver integrated with the decoder as to a decoder unit functioning in combination with a physically separate receiver or, indeed, a decoder including other functionalities or integrated with other devices, such as combined television/decoder devices. Similarly, the term <<digital television system>> refers to any satellite, terrestrial, cable etc digital broadcast system.

BRIEF DESCRIPTION OF THE DRAWINGS

There will now be described, by way of example only, a preferred embodiment of the present invention, with reference to the attached figures, in which.

DETAILED DESCRIPTION

Figure 1:
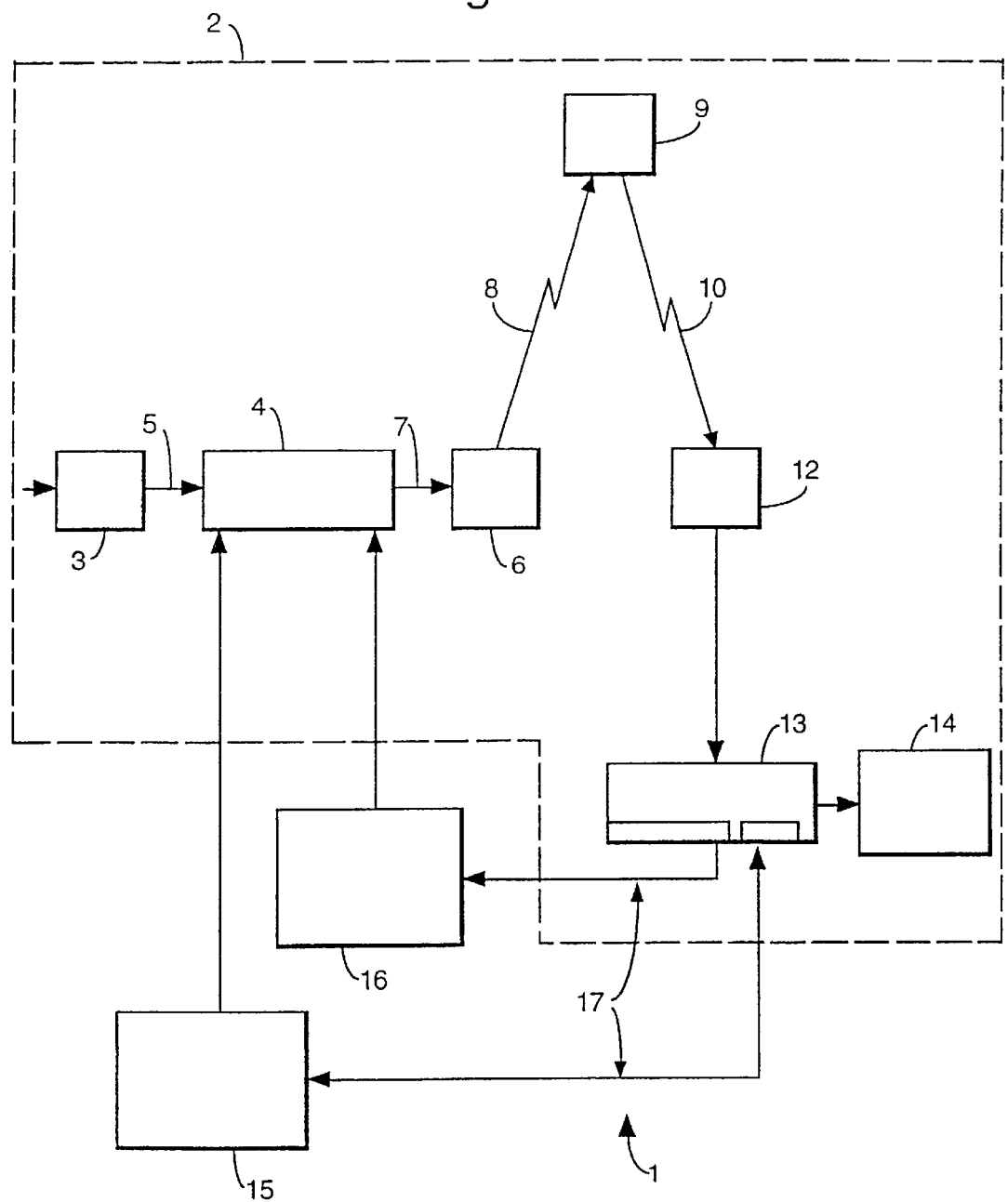
FIG. 1 shows a digital television system as may be adapted according to the present invention.

An overview of a digital television system 1 according to the present invention is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles one or more transport streams and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well-known in the field of pay TV systems. Typically, scrambled data is transmitted together with a control word for descrambling of the data, the control word itself being encrypted by a so-called exploitation key and transmitted in encrypted form.

The scrambled data and encrypted control word are then-received by the decoder 13 having access to an equivalent of the exploitation key stored on a smart card inserted in the decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the decoder, enables the end user to interact with various applications via a modem back channel 17. The modem back channel may also be used for communications used in the conditional access system 15. An interactive system may be used, for example, to enable the viewer to communicate immediately with the transmission centre to demand authorisation to watch a particular event, download an application etc.

Figure 2:
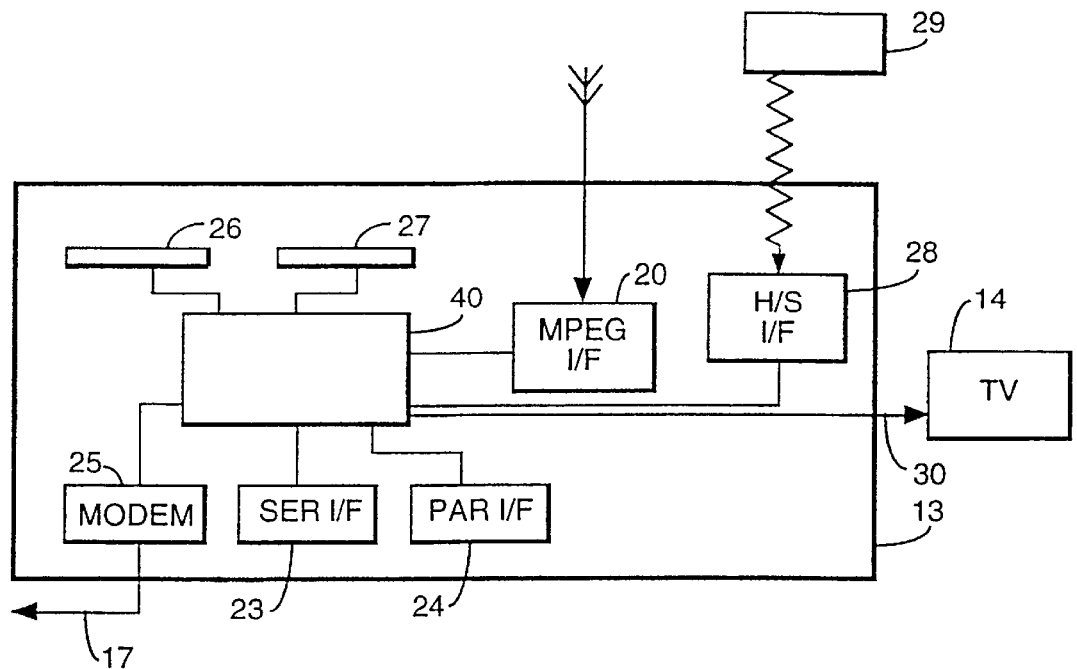
FIG. 2 shows an overview of the elements of a decoder for use in a digital television system.

Referring to FIG. 2, the elements of the receiver/decoder 13 or set-top box adaptable to be used in the present invention will now be described. As will be understood, the elements of this decoder are largely conventional and their implementation will be within the capabilities of one skilled in the art.

As shown, the decoder 13 is equipped with several interfaces for receiving and transmitting data, in particular an MPEG tuner and demultiplexer 20 for receiving broadcast MPEG transmissions, a serial interface 23, a parallel interface 24, and a modem 25 for sending and receiving data via the modem channel 17. In this embodiment, the decoder also includes a first and second smart card reader 26 and 27, the first reader 26 for accepting a subscription smart card containing decryption keys associated with the system and the second reader 27 for accepting bank cards or other specialised cards.

The decoder also includes a receiver 28 for receiving infra-red control signals from a handset remote control 29 and a Peritel output 30 for sending audiovisual signals to the television 14 connected to the decoder.

Processing of data within the decoder is handled by a central control unit 40. The software architecture of the control unit may correspond to that used in a known decoder and will not be described here in any detail. It may be based, for example, on a virtual machine interacting via an interface layer with a lower level operating system implemented in the hardware components of the decoder. In terms of the hardware architecture, the decoder will be equipped with a processor, memory elements such as ROM, RAM, FLASH memory etc. as in known decoders.

The control unit 40 may be adapted to run a number of applications defining the functionality of the decoder. An application introduced into the decoder corresponds to a section of code introduced into the machine that permits the control, for example, of higher level functions of the machine. Typical applications may include the generation of a graphic sequence on the screen of the television display in response to a command from the remote control, or the emission of a message via the modem 5 to the server associated with the digital broadcast system.

As will be later described, an application according to the present embodiment of the invention enables the generation of an icon in response to a event message received in the transmitted MPEG flow, together with a channel change operation in dependence on signals received via the remote control 29.

Applications may be resident applications stored in the ROM or FLASH of the decoder or applications broadcast and downloaded via the MPEG interface 20 of the decoder or, indeed, any other interface of the decoder such as the serial port 23, a smart card reader 27 etc. Applications can include program guide applications, games, interactive services, teleshopping applications, as well as initiating applications to enable the decoder to be immediately operational upon start-up and applications for configuring the decoder.

Applications are stored in memory locations in the decoder and represented as resource files comprising graphic object description files, unit files, variables block files, instruction sequence files, application files, data files etc. Applications downloaded into the decoder may equally be retransmitted from the decoder to a PC connected to the decoder.

Conventionally, applications downloaded into the decoder via the broadcast link are divided into modules, each module corresponding to one or more MPEG tables. Each MPEG table may be divided into a number of sections. For data transfer via the serial and parallel ports, modules are also split into tables and sections, the size of the section depending on the channel used.

In the case of broadcast transmission, modules are transported in the form of data packets within respective types of data stream, for example, the video data stream, the audio data stream, a text data stream. In accordance with MPEG standards each packet is preceded by a Packet Identifier (PID) of 13 bits, one PID for every packet transported in the MPEG stream. A programme map table (PMT) contains a list of the different streams and defines the content of each stream according to the respective PID. A PID may alert the device to the presence of applications in the data stream, the, PID being identified by the Puff table.

Figure 3:
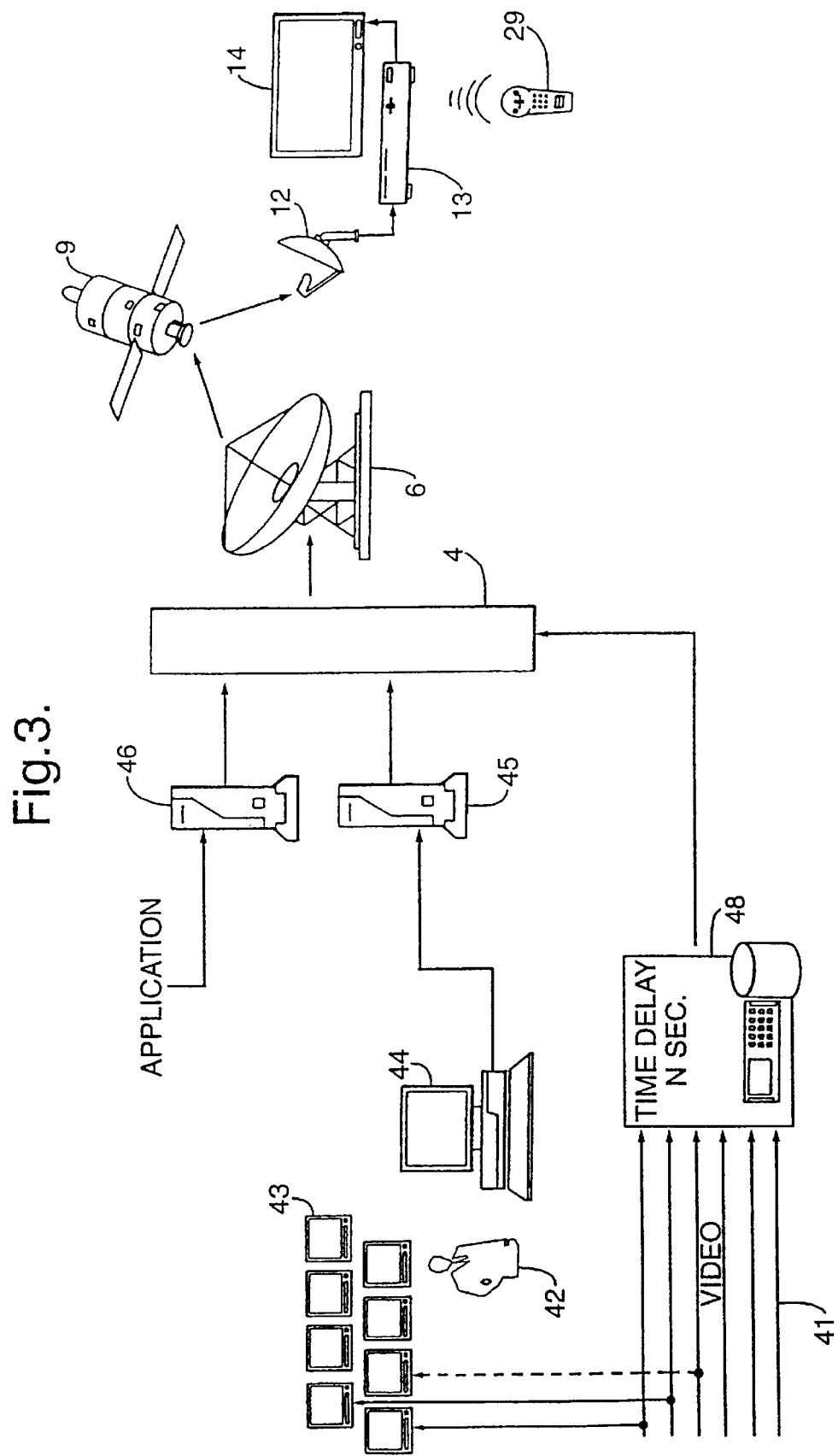
FIG. 3 shows the digital television system of FIG. 1 as adapted to include a means for generating in real time an event message introduced into the transmitted data stream.

Referring to FIG. 3, there will now be described an embodiment of this invention. As shown, digital audio and video information for a number of channels 41 passes via a digital delay device 48 to a multiplexer 4 for subsequent transmission. In the present case, a time delay of approximately 30 seconds in the transmission of the audiovisual information is introduced. This may be carried out, for example, by simply stocking the digital signals on a server hard disc or the like before transmission to the multiplexer. In an alternative realisation, the delay may be carried out at the receiver end by the decoder.

In one realisation, the digital audiovisual signals may be compressed and multiplexed in a first stage of multiplexage, before being passed to a digital delay. After the delay, the signal passes to a second multiplexer for multiplexing with other data, including an event message (see below). This has the advantage of reducing the amount of information stored on the disk, but may increase the risks of error in the signal.

Figure 4:
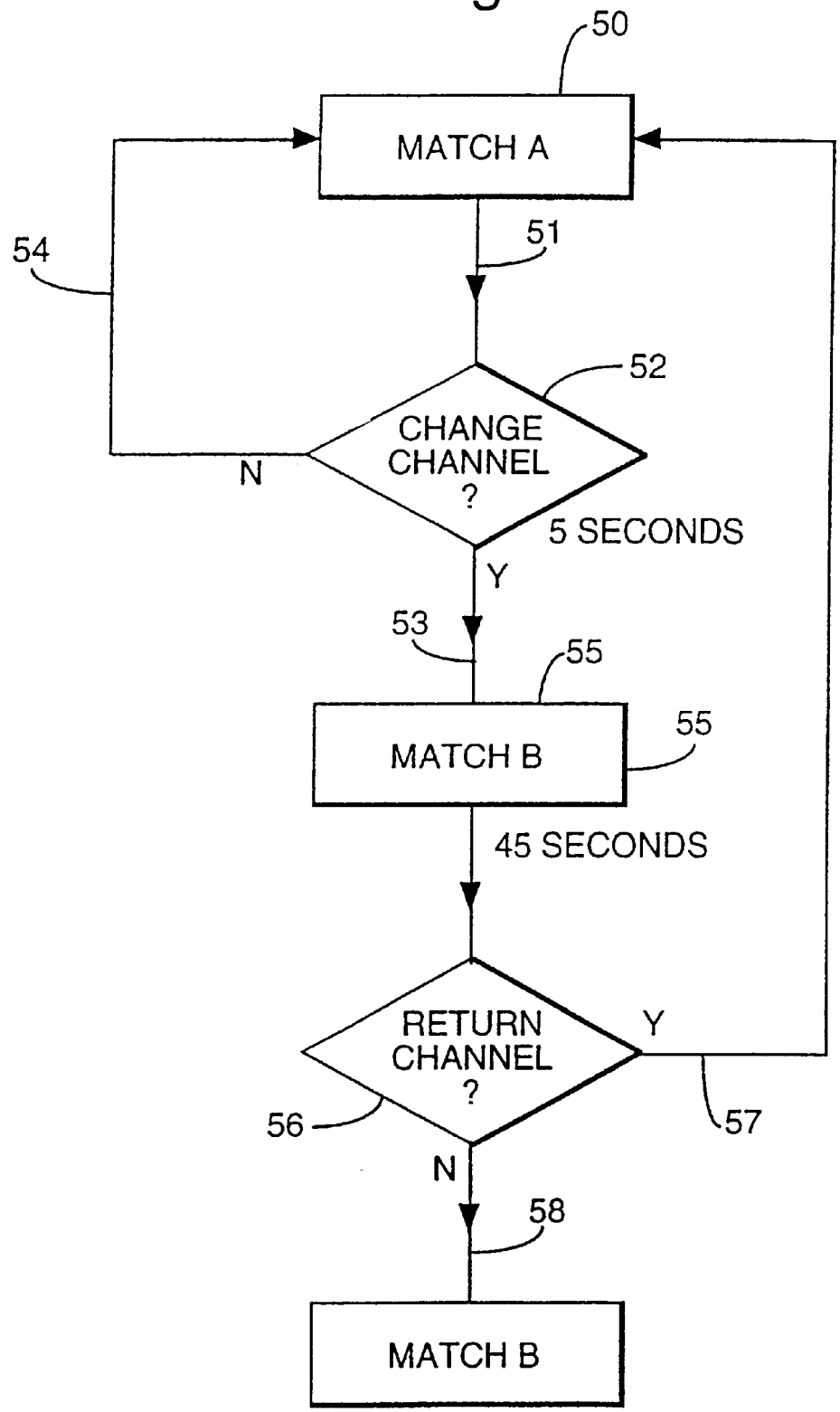
FIG. 4 shows the decision flow chart of the application present in the decoder for treating the real time event message.

In the present embodiment, the digital auidovisual signals are delayed and then passed directly to the multiplexer 4. In FIG. 4, the MPEG compression of the signal is carried out by the multiplexer 4 itself, rather than a separate compression unit, as shown in FIG. 1.

In the case, for example, of a football tournament, the video and sound data for each match is broadcast on a separate channel by the multiplexer and transmitter arrangement. A "channel" may be defined by a frequency channel, or as is usually the case in digital television, simply by a logical definition of the channel in the data sent, such as the DVB co-ordinates of the channel. An operator 42 located at the broadcast centre watches all the matches simultaneously as displayed on a bank of monitors 43. The operator is provided with a dedicated PC or computer 44 equipped with an application adapted to generate an event message that may be transmitted via a one-shot injection unit 45 and the multiplexer 4 into the MPEG flow transmitted by the transmitter 6. The injection unit 45 is a standard piece of equipment used to ensure synchronism of injected data with the multiplexer.

In the event of a goal in one of the matches, the operator enters in real time into the computer 44 (i) the information that a goal event has occurred and (ii) on which channel the goal event has occurred. The computer 44 generates an MPEG section containing this information in a form adapted to be read by an application based in the decoder 1. This section is then multiplexed into the data stream associated with each of the channels by the multiplexer 4.

As will be understood, a signalled event message is introduced immediately into the transmitted data stream whilst the video and sound data are introduced some 30 s later. In practice, the injection and multiplexing of the event message in the data stream may introduce a small delay, but this is insignificant in comparison with the delay introduced to the video and audio information.

As will be described, the decoder is equipped with an application adapted to receive and interpret the arrival of an event message. This application may be included in the decoder as manufactured. However, in view of the need to conserve memory space in the decoder, this application is preferably transmitted to the decoder in the same manner as other decoder applications, that is, via the MPEG transmission route. In this case the application may be introduced via an injection device 46 to the multiplexer, for example before the match starts, either automatically or at the request of the viewer. The injection device 46 is similar to the injection device 45, with the difference that the application is sent in a continual cycle to the multiplexer for transmission, whilst the event message is a one-off transmission.

Referring now to FIG. 4, the decision steps in an application introduced into the decoder 13 to handle event messages received from the transmission centre will now be described. At step 50, the viewer is watching a match A on one of the transmitted channels. At the moment 51, an event message is received informing the decoder of a goal event occurring on another channel associated with match B. As will be appreciated, in view of the time delay introduced in the transmission of the video and sound data, this event message will arrive some 30 seconds or so before the goal is shown on the associated channel.

In practice, emission of the event message will depend on the reflexes of the operator manning the observation point and the event message may arrive 25 seconds or so before the event. In the unusual case of two events occurring simultaneously on two different channels, the operator will have to decide which of the goals represents the most interest to the viewing public and, again, this may slightly reduce the time of advance of the event message in comparison with the event itself.

In response to the arrival of an event message indicating a goal event on a channel other than that being watched at that moment, the application displays for a period of 5 seconds or so an icon on the television screen informing the viewer of the imminence of a goal at step 52. The "OK" icon will be removed from the screen upon change of channel by the viewer or after the end of the 5 seconds period if the viewer has not changed channel.

If desired, the icon may indicate the channel or the match in which the goal occurred to allow the viewer to decide if he wants to watch the goal. In its simplest embodiment, however, the icon may just indicate that a goal has occurred, e.g. by an "OK" icon being displayed.

In the event that the viewer replies to the enquiry at step 52 with a "yes" command 53 the application will change to the channel showing the match B in question at step 55. The "yes" command may correspond, for example, to the reception by the decoder of a signal from the remote control associated with the decoder indicating that any of the buttons or a specific button of the remote control (e.g. an "OK" button) has been depressed.

In the event that a "no" instruction 54 is received, the decoder will stay tuned to match A. The "no" command can, for example, simply correspond to the absence of a command from the remote control in the 5 second following the display of the icon at step 52.

Alternatively, the decoder can be programmed by the application in the opposite sense, i.e. the application will automatically change to the channel where the goal has occurred unless an instruction is received from the remote control in the 5 seconds which follow the display of the icon on the screen.

Note that in the case where an event message arrives indicating a goal event on the channel to which the decoder is tuned, the application can either display the same or another icon indicating to the viewer the presence of a goal on that channel or may display a warning icon ("CONFIRM CHANGE") in the event that the viewer attempts to change channel during the delay before the event arrives.

As described above, in view of the time lag introduced in the transmission of the televised match, a viewer who changes channel will arrive 20 seconds or so before the occurrence of the goal on that channel. Thus, whilst the viewer will have the sensation of watching all matches "live" he will also have the advantage of being able to quickly and easily retune to a match where a goal occurs.

After a further predetermined time, e.g. 45 seconds or so after the change of channel, the application can be arranged to display a second icon at step 56 asking the viewer if he wants to change back to the original match A shown on the first channel. After this time has elapsed, it can be assumed that the goal has been shown, together with all the replays, analysis etc. This time may be measured starting from the receipt of the original command to change channel, or starting from the reception of the event message, with a proviso not to display the message if the viewer has remained with match A.

Again, the icon asking the viewer if he wishes to return to the original match A may simply be an icon "OK" or the like. In the event that the viewer presses the "OK" command on the remote control this will be interpreted as a "yes" command 57 and the decoder will return to match A. In the event that no "OK" signal is received within 5 seconds after the display of this icon the decoder will remain tuned to the match B.

Modifications of the system may be envisaged, for example, to enable the application to receive and process a plurality of messages arriving at the same time or within the time frame of operations between steps 50 and 56 described above. For example, the application may indicate the arrival of a new goal event after the first change of channel so as to allow the viewer to again change channel if he wishes. In addition or alternatively, it may be possible to display two or more event messages simultaneously indicating a first goal event on channel X for match C, a second goal event on channel Y for match D etc.

Equally, whilst the present embodiment has been described in relation to the indication of goal events occurring during a football match, the same system may be used in other live broadcast contexts where it would be desirable to inform a viewer watching one channel of the occurrence of an event on another.

What is claimed is:

1. A digital television system comprising:
   a transmission means for transmitting digital audiovisual information on a plurality of channels;
   a means for introducing in real time an event message concerning a live event broadcast on at least one channel into the datastream of at least one other channel, wherein the event message comprises information regarding the occurrence of an event and the channel on which the event has occurred so that a change of channel in response to said event message allows a viewer to watch both the build-up to the event and the event itself;
   said transmission means further comprising a delay device for introducing a predetermined delay into the transmission time of the audiovisual information broadcast on each of the channels.

2. A digital television system as claimed in claim 1 in which the audiovisual data is transmitted in an MPEG format.

3. A digital television system as claimed in claim 1 in which the means for introducing an event message comprises a computer adapted to generate an event message in response to a command by an operator.

4. A digital television system in claim 3 in which the computer is adapted to send an event message in the form of a predetermined MPEG section.

5. A digital system as claimed in claim 1 further comprising a decoder adapted to display an icon on the screen upon reception of an event message to indicate the occurrence of an event.

6. A digital television system as claimed in claim 5 in which the decoder is adapted to automatically change to the channel on which the event has occurred following a "yes/no" response by the viewer to the displayed icon.

7. A digital television system as claimed in claim 6 in which the "yes" response corresponds to a signal from a remote control associated with the decoder indicating that any of the buttons or a predetermined button of the remote has been depressed.

8. A digital system as claimed in claim 6 in which the "no" response corresponds to a lack of response by the viewer to the displayed icon.

9. A digital system as claimed in claim 5 in which the decoder is adapted to display a further icon on the screen after a change of channel by the viewer in response to the first displayed icon.

10. A digital television system as claimed in claim 5, in which the increased functionality in the decoder is implemented by programming the decoder with a software application.

11. A digital television system as claimed in claim 10 in which the application is downloaded in the decoder by the transmission means.

12. A digital television system as claimed in claim 1, in which the transmission means further includes encryption means for encrypting transmitted digital data, including the transmitted audiovisual data and the transmitted event message.

13. A digital television system as claimed in claim 12, further comprising a decoder provided with decryption means adapted to decrypt the broadcast digital data prior to viewing of the audiovisual data and processing of the event message.

14. A digital television system according to claim 1, further comprising:
   a decoder adapted to receive and process a real time event message.

15. A decoder as claimed in claim 14 adapted to display an icon in response to a received event message.

16. A method for transmitting digital audiovisual information on a plurality of channels comprising:
   introducing a predetermined delay into the transmission time of the audiovisual information broadcast on each of the channels; and
   introducing in real time an event message concerning a real time live event broadcast on at least one channel into the datastream of at least one other channel, wherein the event message comprises information regarding the occurrence of an event and the channel on which the event has occurred so that a change of channel in response to said event message allows a viewer to watch both the build-up to the event and the event itself.

* * * * *